United States Patent [19]

Ranner

[11] Patent Number: 4,775,014
[45] Date of Patent: Oct. 4, 1988

[54] GROUND-WORKING IMPLEMENT

[75] Inventor: Dietrich Ranner, Eugendorf/Salzburg, Austria

[73] Assignee: Bombardier-Rotax-Wein Produktions- und Vertriebsgesellschaft M.B.H., Vienna, Austria

[21] Appl. No.: 827,284

[22] Filed: Feb. 6, 1986

[51] Int. Cl.⁴ .......................... E02F 3/78; E02F 33/02
[52] U.S. Cl. ..................................... 172/72; 172/112; 172/474; 37/222
[58] Field of Search ..................... 172/72, 63, 71, 112, 172/474; 37/222, 220, 223, 224, 197

[56] References Cited

U.S. PATENT DOCUMENTS

| 3,130,796 | 4/1964 | Rogers | 172/117 |
| 3,693,722 | 9/1972 | Brown | 172/72 |
| 4,523,398 | 6/1985 | Scheibel | 37/222 |
| 4,559,725 | 12/1985 | Wieland | 37/222 |

FOREIGN PATENT DOCUMENTS

| 1103668 | 3/1961 | Fed. Rep. of Germany . |
| 2108684 | 8/1972 | Fed. Rep. of Germany . |
| 2321271 | 10/1974 | Fed. Rep. of Germany . |
| 2549779 | 5/1977 | Fed. Rep. of Germany . |
| 2640128 | 7/1977 | Fed. Rep. of Germany . |
| 8202513 | 8/1982 | France . |

Primary Examiner—Richard J. Johnson
Attorney, Agent, or Firm—Herbert Dubno

[57] ABSTRACT

A ground-working implement for rotary field tilling or ice or snow-tending on ski slopes or the like which is drawn by a tractor or a tracked vehicle and which comprises a holder connected to the vehicle pendulously by a longitudinal beam which can be raised and lowered. The holder is connected to a rotary ground-loosening unit and a smoothing board by a four-point linkage whose cranks are dimensioned so that upon raising of the ground-loosening unit the orientation of the smoothing board remains largely unaltered thereby allowing the latter to be used for leveling the ground when the ground-loosening unit is in its raised or rest position.

13 Claims, 7 Drawing Sheets

GROUND-WORKING IMPLEMENT

FIELD OF THE INVENTION

My present invention relates to a ground-working implement and, more particularly, to an agricultural machine for ground-working purposes which has a working position in which parts of the machine are oriented for ground-working purposes and a travel position in which the tool or tools (cutters or shares) of the implement are swung into an inoperative or rest position.

BACKGROUND OF THE INVENTION

Ground-working implements of a tractor-drawn type can include a cutting tool and a smoothing board which cooperates therewith in leveling the turned ground, upon a common tractor-drawn or tractor-mounted support. Such implements generally have a common support beam for the smoothing board and the cutter and with which these members can swing relative to the implement frame in a pendulous movement. Another pivotal mounting at least for the tool allows, in part, the tool to be raised and lowered relative to the ground between ground-working (operative) and rest (inoperative) positions, the latter of which may be used for higher-speed travel of the implement over the ground.

Ground-working implements for agricultural lands can have soil-loosening tools, preferably constituted as rotating members, e.g. tilling tines or cutters, which serve primarily to loosen surface zones, the smoothing board here serving to level the loosened soil and prepare it for sowing.

Should a swinging coupling be provided between the coupling beam and the holder in these rotary tilling devices, the implement can readily compensate the position of the device with respect to the ground by the pendulous movement of the support or coupling beam about the longitudinal axis thereof. This can also assist in adjusting the height of the implement with respect to the drawing vehicle, for example a tractor, because the coupling beam can be connected to the tractor so as to be swingable up and down relative thereto.

While such equipment is excellent for agricultural preparation it can, of course, also be used exclusively for ground leveling using the smoothing board or blade with the cutting tool or tools in their raised positions.

A conventional implement of the latter type, in which rotating tools are mounted so that the cutter can be swung upwardly on journals provided on the smoothing blade, makes use of a cylinder mounted on the holder and whose piston at its free end is pivotally connected to an articulation on the housing for the cutter. This arrangement can, therefore, without altering the position of the smoothing board or blade, allow the cutter to be swung upwardly into its inoperative position in which the cutter is withdrawn from contact with the ground.

The smoothing board, on the other hand, is swingably mounted on the holder and can be pivoted by a further piston/cylinder unit about its journal on the holder. The two journals provided on the smoothing board, namely the journal upon which the cutter unit is swingable and the journal by which the smoothing board is connected to the holder, are only spaced apart minimally. As a consequence, when the smoothing board is swung even through a relatively large angle between smoothing board and ground, there is only a comparatively small angular change of the position of the cutter. The control of the cutter and smoothing board is thus done separately by respective operator-controlled effectors. The earlier implement is relatively massive and bulky and, because of the aforedescribed control system, requires excessive attention on behalf of the operator for reliable operation.

OBJECTS OF THE INVENTION

It is, therefore, the principal object of the present invention to provide an improved ground-working implement whereby the disadvantages of earlier implements are obviated.

Another object of this invention is to provide an implement which is more serviceable and more readily controlled than the implements described.

Yet another object of my invention is to provide an improved tilling implement whose kinematics facilitate operation without undo attention and which can be more compact than earlier machines.

SUMMARY OF THE INVENTION

These objects and others which will become apparent hereinafter are attained, in accordance with the present invention, with a ground-working implement adapted to be drawn by or carried by a vehicle and which comprises a ground-loosening unit and a smoothing board, as previously described, together connected to a coupling beam by a holder which can swing about a longitudinal axis of this beam and can be raised and lowered relative to the vehicle by the beam.

According to the invention, a four-point linkage is connected to the soil-loosening unit with one of two cranks of the four-point linkage which is fixed to the soil-loosening unit and such that the main bearing of this crank is preferably fixed on the holder. The smoothing board is connected to a coupling of this linkage and the main bearing of the second crank of the four-point linkage engaging the smoothing board is preferably adjustably mounted on the holder.

With this arrangement it is possible, using a single actuating element, for example, a piston/cylinder unit or arrangement to swing the soil-loosening unit up and out of the ground into its travel position while the smoothing board is permitted to remain generally in its original position. This piston/cylinder unit can be provided between one of the elements of the four-point linkage and the holder.

The term "crank" as used herein is intended to refer to the structure which connects the distance between a main bearing of the four-point linkage frame and the associated journal position on the coupling of the four-point linkage.

Advantageously the adjustability of the main journal of the crank which is adjustable on the holder preferably is achieved via a swingable lever which itself can pivot about the journal axis of the main bearing of the other crank of the four-point linkage and which is provided with a fixing unit for holding the adjusted position of this lever.

In this manner it is possible to set the smoothing board on the soil-loosening unit for different ground contours and inclinations so that only the swingable action of the four-point linkage need be applied to lift the soil-loosening unit out of the ground or bring it into action.

I have found it to be advantageous to construct the linkage so that within its swinging range between the working and rest positions of the soil-loosening unit, the position of the coupling of the four-point linkage remains unchanged preferably within a tolerance of ±5°. This ensures that the position of the smoothing board relative to the ground will remain unchanged with elevation of the soil-loosening unit from the ground, thereby eliminating any need for after-adjustment of the smoothing board when leveling with the smoothing board or blade alone is desired after the field has been tilled.

It is especially advantageous to provide the difference in lengths between the cranks of the four-point linkage so that it is at most 30% of the length of the longer crank carried by the soil-loosening unit. This small length difference between the cranks ensures that even with large positional changes of the cranks with respect to the frame as may be required for swinging up the soil-loosening unit, the position of the coupling will remain largely unchanged so that the angular orientation of the smoothing board to the ground remains essentially the same as prior to the elevation of the soil-loosening unit.

Preferably in the working position of the soil-loosening unit, the coupling includes an angle of between 45° and 90° with a parallel to the ground and most advantageously this angle is about 60° and can be achieved by a corresponding adjustment of the four-point linkage.

As further insurance that the coupling position will change at most only slightly with elevation of the soil-loosening unit, it is advantageous to make the length of the longer crank about 5 to 6 times the length of the coupling. The penetration or tilling depth of the tilling unit in the soil can be adjusted by making the length of the crank which is not rigid with the tilling unit adjustable, preferably through the use of an effective length-changing device such as a hydraulic cylinder.

The setting unit for the lever which carries the four-point linkage frame is preferably a screw-spindle traversing the lever carrying the crank main bearing and which is also provided with a nut braced against the lever and threaded onto the spindle. The spindle itself is preferably mounted on a rubber cushion fixed to the holder.

BRIEF DESCRIPTION OF THE DRAWING

The above and other objects, features and advantages of the present invention will become more readily apparent from the following description, reference being made to the accompanying drawing in which.

SPECIFIC DESCRIPTION

In the drawing I have shown at 17 a vehicle, in this case a tractor, upon which the implement of the invention is mounted, e.g. via a hitch. This hitch can include a cylinder 22 whose piston 22a is pivotally connected to 32a to a lug 32 rising from a support beam 1 which is hinged to two spaced-apart lugs to the tractor. One of these lugs is shown at 22b and can be assumed to be on the left side of the tractor, there being a corresponding lug not shown on the right side of the tractor. The rear wheels of the tractor are represented by the right hand wheel 22c thereof. The beam 1 is thus swingable on the tractor 17 under the control of the piston/cylinder unit 22, 22a and when the piston 22a is retracted by the cylinder 22, the implement can be raised whereas extension of the piston 22a from the cylinder will tend to swing the implement about a horizontal axis 22d and thereby lower the implement. The wheel 22c is also pivotally mounted on the tractor although this pivot mounting is not illustrated.

Figure 8:
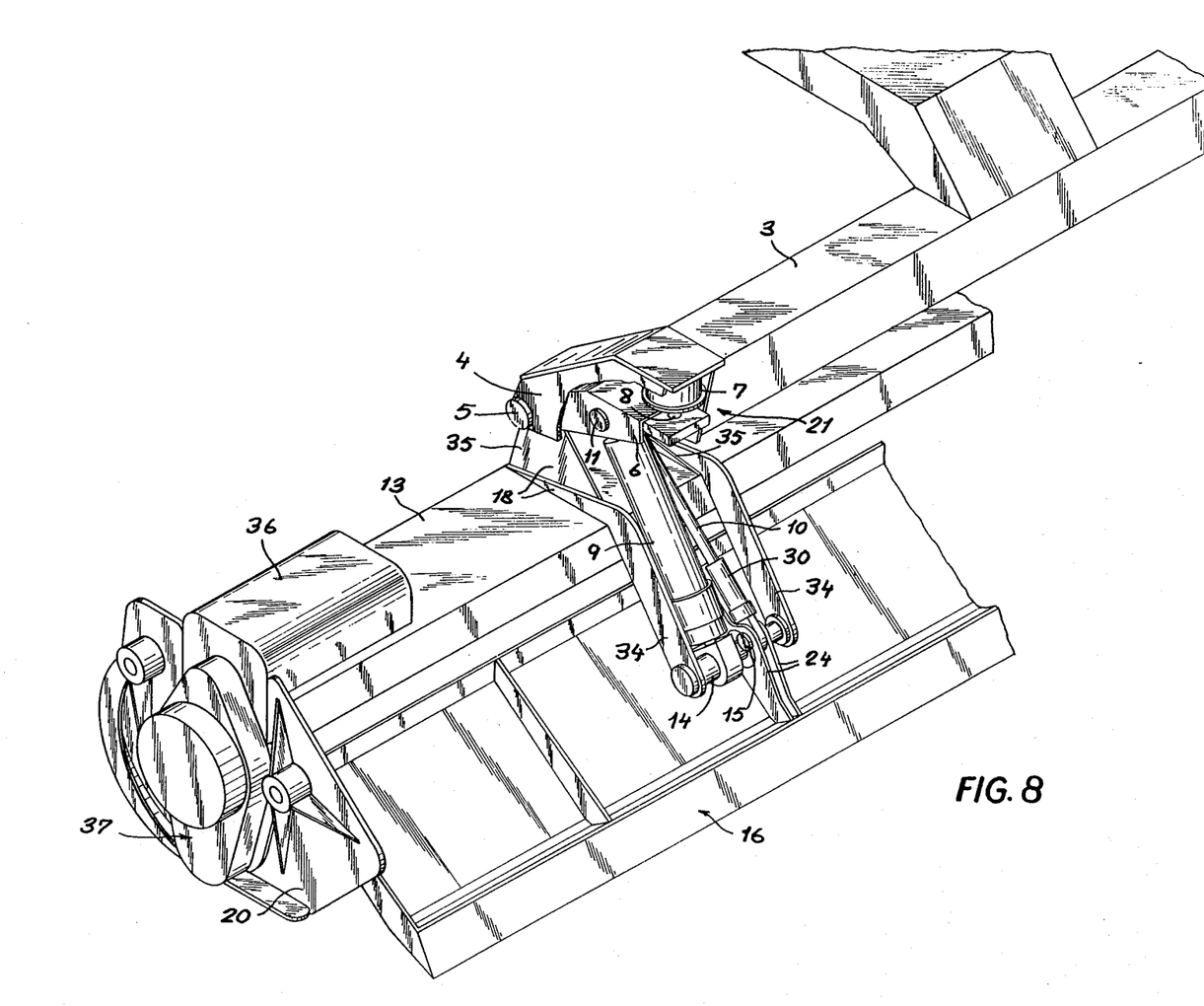
FIG. 8 is a perspective view from the rear showing the implement.

An elastic joint 2 connects the beam 1 to a holder 3 which carries the ground-loosening unit 19, e.g. shaft carrying spaced apart tilling tines 19± which can be rotated about an axis 19a and an appropriate drive for these tilling tines, e.g. a power-takeoff gearing coupled with the power-takeoff shaft of the tractor, or a gasoline or other engine or motor connected in any conventional manner with the shaft 19b of the cutter or tiller unit 19. The preferred drive is, however, hydraulic as described below. The holder also carries a smoothing or leveling board or blade 16 (FIG. 8) which is generally open and which is disposed behind the tiller 19 and serves to smooth out the loosened soil and level the loosened soil thrown up by the tiller.

The elastic joint 2 enables a pendulous of swingable movement of the holder 3 about the longitudinal axis 33 of the coupling beam 1 so that the soil-loosening unit and the leveling board can assume different inclinations about this axis to compensate for contours of the tilled field.

Tilling or cultivating blades, shoes, skids, spikes and even discs may also be used and the implement need not be exclusively employed for soil tilling but can be utilized, for example, to loosen and level ski slopes or the like by breaking up hard-packed snow and ice and for otherwise improving the surfaces of ski slopes and like facilities. In the latter case, the vehicle drawing or carrying the implement will usually be a tracked vehicle.

Figure 4:
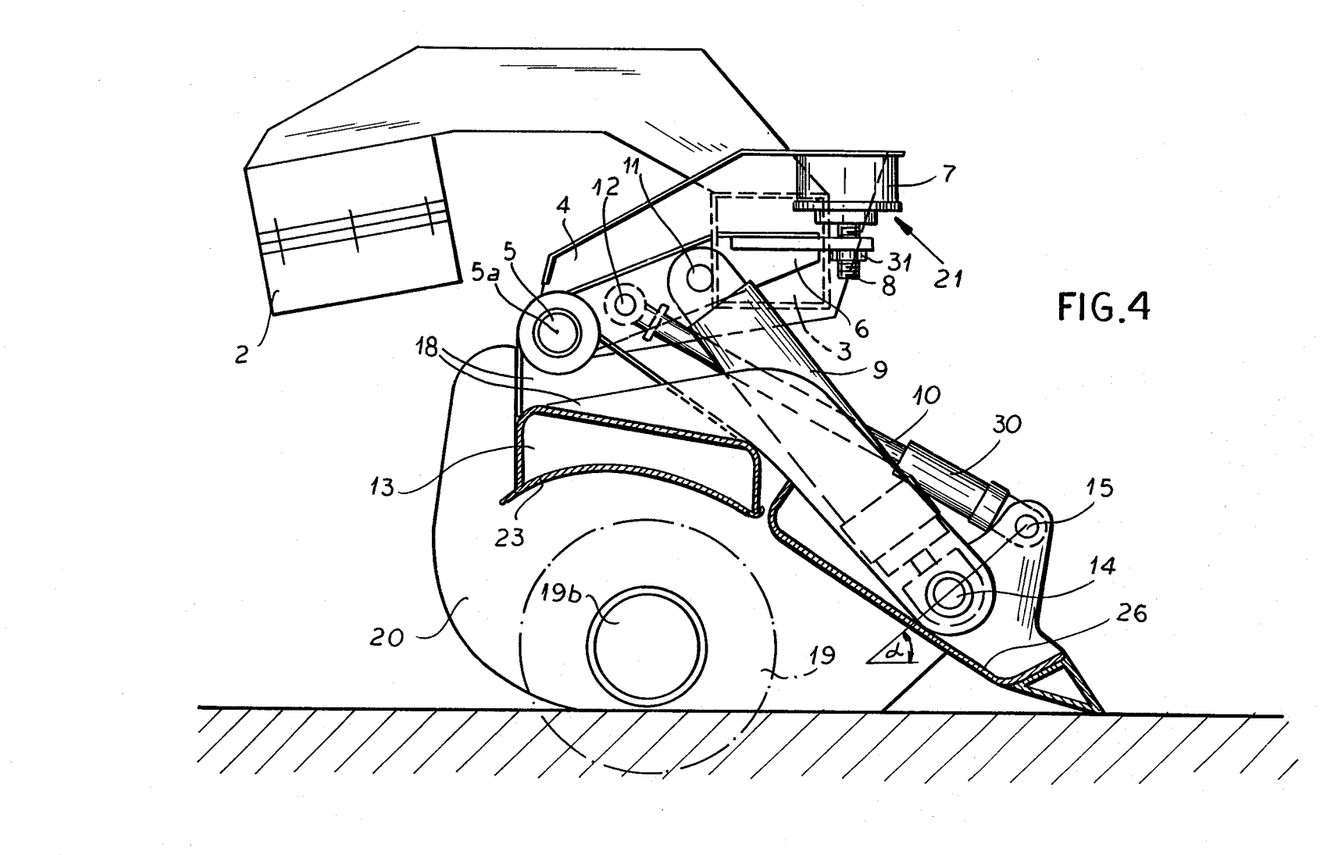
FIG. 4 is a view similar to FIG. 2 but drawn to a larger scale to illustrate the kinematics of the apparatus with the tool or cutter in its working position.
Figure 5:
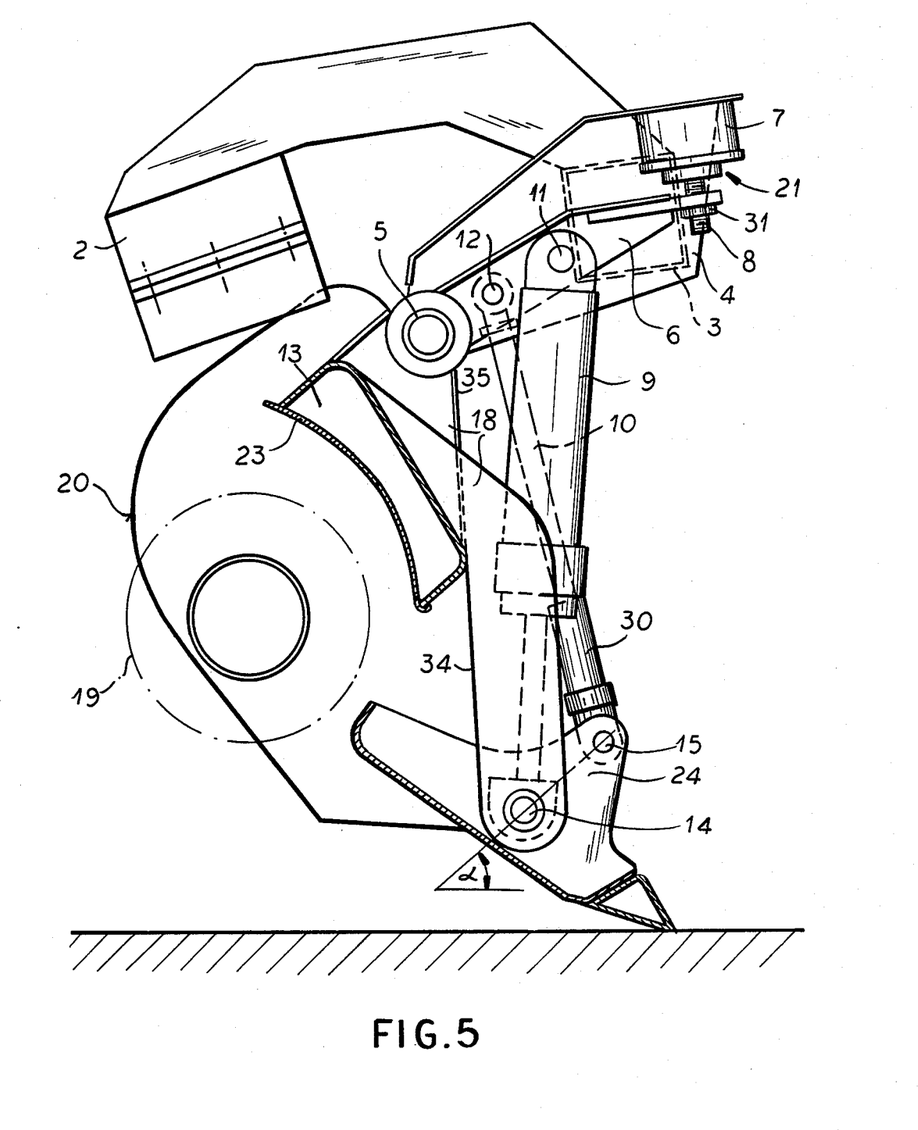
FIG. 5 is a sectional view of a tiller similar to that of FIG. 4 and drawn to the same scale but showing the cutter raised.

The ground-loosening unit 19 is connected by a journal 14 with the smoothing board 16 so that the ground-loosening unit 19 can be swung about the pivot axis 14a of this journal from the working position shown in FIG. 4 to the upper position shown in FIG. 5, the latter being a rest or travel position in which the loosening unit 19 is spaced above the ground.

The ground-loosening unit 19 is connected rigidly with a crank 18 of a four-point linkage. The crank 18 is formed from two ribs 34 and respective connecting plates 35 which are each in turn connected to one of the ribs and jointly connected to a main bearing 5 whose pivot axis has been represented at 5a in FIG. 6 and FIG. 4. This pivot axis 5a is parallel to the axis 14a.

The ribs 34 are fastened on a box-like carrier or girder 13 which has a longitudinal axis parallel to the axis 19a of rotation of the ground-loosening device 19 and which forms on its underside a protective hood 23 for the rotating-tiller arrangement of the unit 19, which has been shown only diagrammatically.

Figure 2:
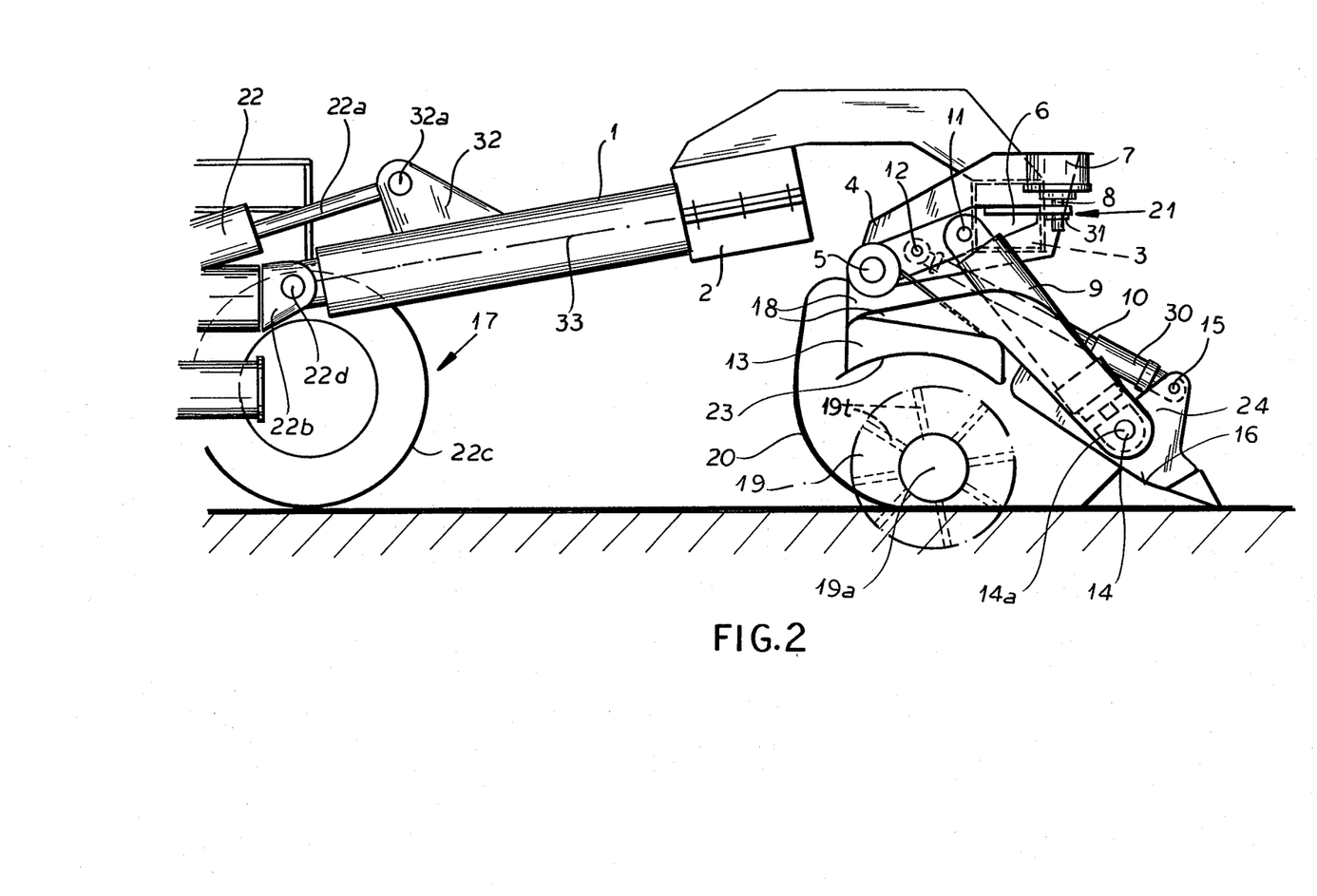
FIG. 2 is a section taken along the line II—II of FIG. 1 showing the connection of the implement with a tractor.
Figure 3:
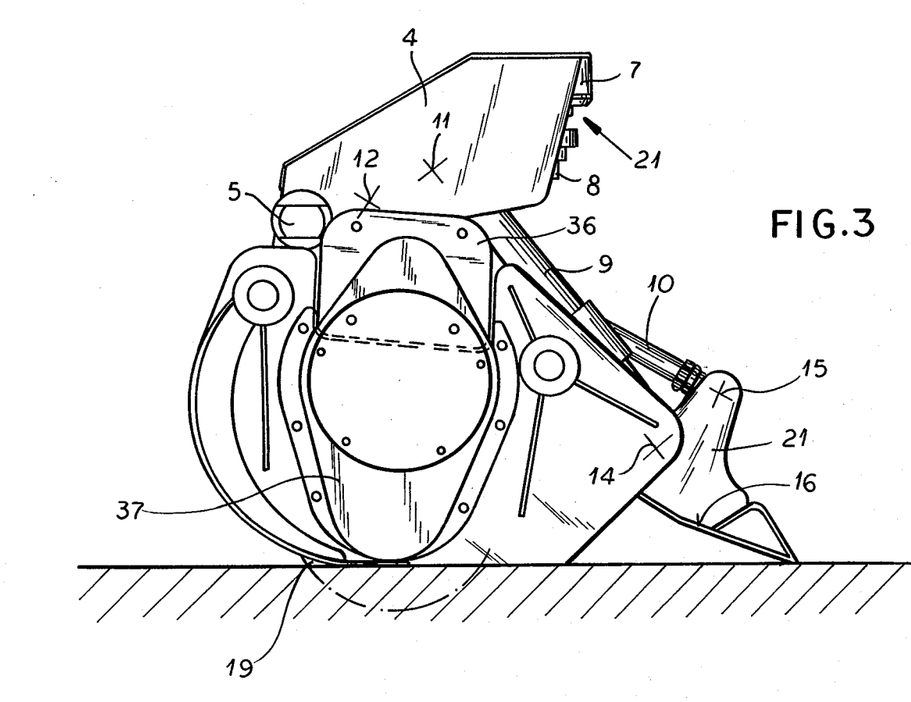
FIG. 3 is an elevational view of the soil-working implement taken in the direction of the arrow III in FIG. 1.

The protective hood 23 covers the ground-loosening unit 19 over its entire length and is continued in effect by the smoothing board 16 in the working position of the device (FIGS. 2 and 4) so that soil or ice particles thrown upwardly and rearwardly by the tiller 19 are guided uniformly along the substantially flush and continuous lower surfaces of the hood 23 and the smoothing board 16 rearwardly onto the ground. The overall enclosure of the soil-loosening device is thereby subdivided so that a portion of this enclosure is formed by the smoothing board 16 which is movable relative to the protective hood 23.

The main bearing 5 of the crank 18 can swing about axis 5a on the holder 3 which preferably also has a square-cross section box profile.

Figure 6:
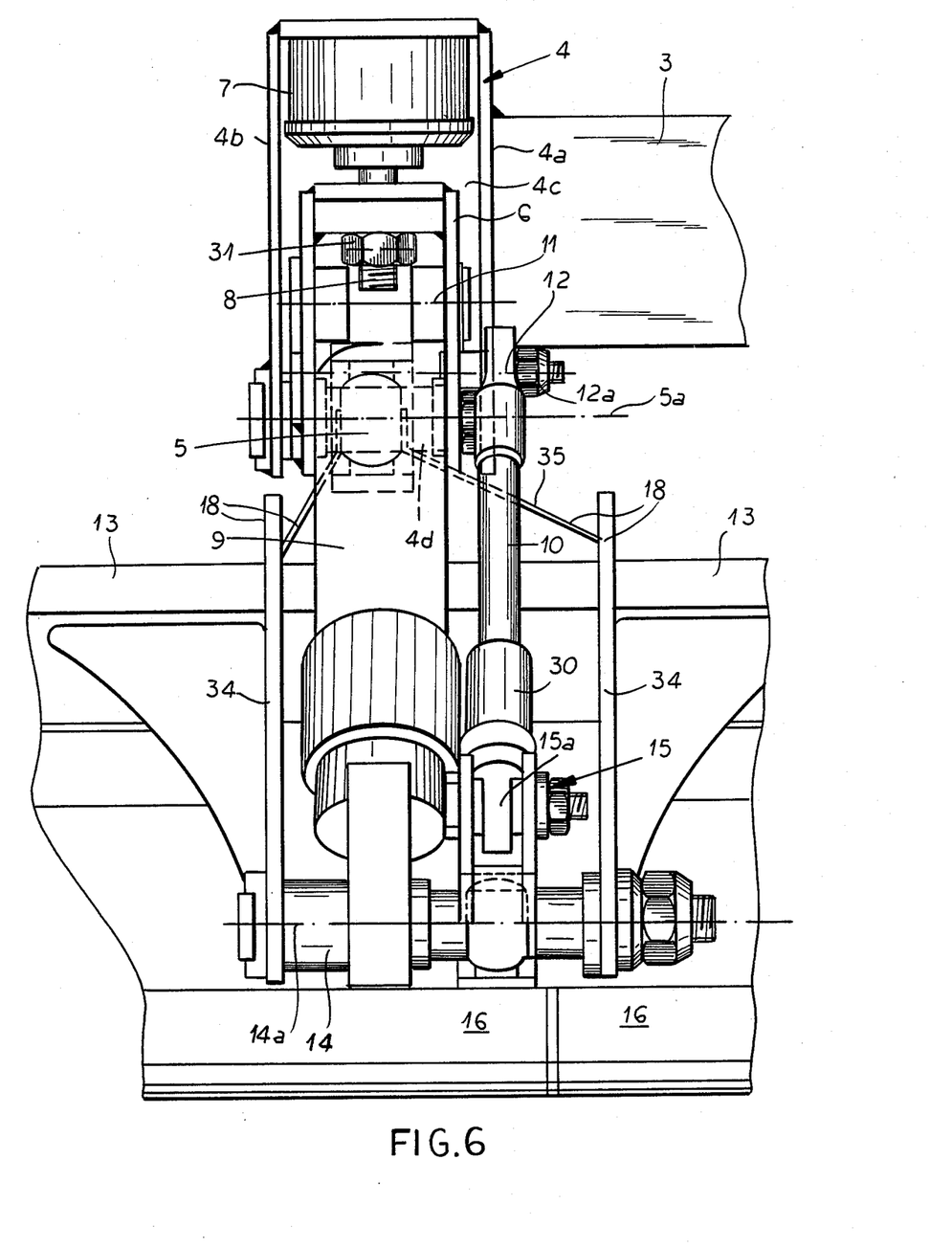
FIG. 6 is a detail view of a portion of the implement shown in FIG. 1 but drawn to a larger scale.
Figure 7:
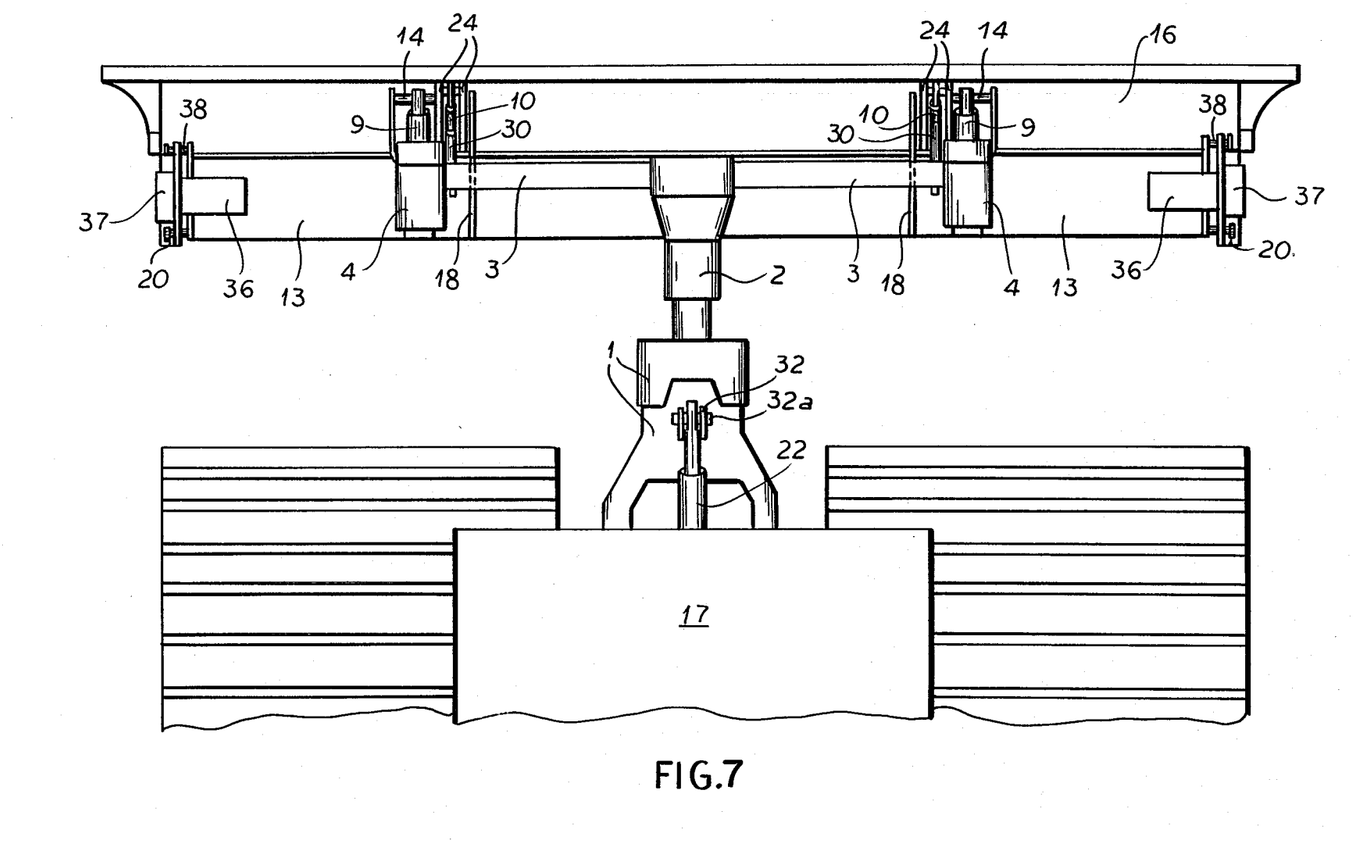
FIG. 7 is a top-plan view of the implement.

The holder 3 can be formed on both lateral ends with respective pocket-forming brackets traversed by pins from the main bearing 5 (FIG. 6). In this case, the main bearing 5 on the left-hand side of the holder 3 has been illustrated and the bracket 4 is seen to be constituted by the pair of plates 4a and 4b which define the pocket space 4c between them. The shaft traversing the main bearing 5 and supported at its ends in the plates 4a and 4b is represented at 4d.

The coupler 24 of the four-point linkage is rigid with the smoothing board 16 so that the smoothing board is coupled into and displaced by movement of the linkage.

The main bearing 12 of the second crank of the four-point linkage, which engages the smoothing board 16 is also connected to the holder 3.

The connection of the holder 3 with the main bearing 12 of the second crank is preferably adjustable. For this adjustment, the main bearing 12 of the crank 10 is fixed on a lever 6 swingable around the journal axis of the main bearing 5 of the other crank 18.

To this end, the lever 6 has a U shape with the shanks thereof swingable about the axis 5a of the main bearing. The adjusted position of the lever 6 can be set by the unit 21 which refers to the adjusting device as a whole.

The swinging of the lever 6 adjusts the position of the frame with respect to the holder 3. The four-point linkage is so dimensioned and arranged in the implement that within the range of the swinging movement of this linkage between the working and rest positions of the tiller assembly 19, the positions of the coupling 24 of the linkage remains practically unaltered although positional tolerances of ±5° from the desired position can be tolerated.

The length difference between the two cranks or links 18 and 10 of the four-point linkage should amount to at most 30% of the length of the longer crank 18 which is connected with the soil-loosening unit 19.

The trestle length of the four-point linkage, i.e. the distance between the axes 5a and 12a of the main bearings 5 and 12 is greater than the length of the coupling 24, i.e. the distance between the crank pivot bearing axes 14a and 15a on the smoothing board. The bearing or journal 14 is, moreover, preferably formed as a ball joint so that the smoothing board 16 is supported in a pendulous manner.

In the working position, the coupling 24 includes an angle α with a parallel to the ground which is preferably 60°, but in any event should lie between 45° and 90°.

The length of the longer crank or link 18, which is rigidly connected to the scil-loosening unit 19 should be between 5 and 6 times the length of the coupling 24 of the four-point linkage. The length of the second crank or linkage 10 can be varied by a setting unit and by changing the length of the crank 10 it is possible to finely adjust the penetration depth of the soil-loosening unit 19 into the ground. The setting unit is preferably a hydraulic cylinder 30 although a screw-spindle arrangement or even a screw-locking arrangement or turnbuckle arrangement with left and right threads can be used for length adjustment. The use of a hydraulic cylinder 30, of course, facilitates adjustment of the depth of the tiller into the ground in a simple manner by the operator.

The setting unit for the lever 6 which carries the four-point linkage frame, comprises a screw spindle 8 traversing the lever 6 and upon which a nut 31 is threaded which can brace against the lever 6. The spindle 8 is in turn fastened on a plate which bears upon a rubber cushion 7 fixed on the holder 3 in the pocket-forming bracket 4.

The drive of the rotary tiller 19 which is preferred, comprises hydraulic motors 36, respectively coupled to the ends of the shaft 19b upon which the tiller tines are mounted by transmission in the housings 37.

Figure 1:
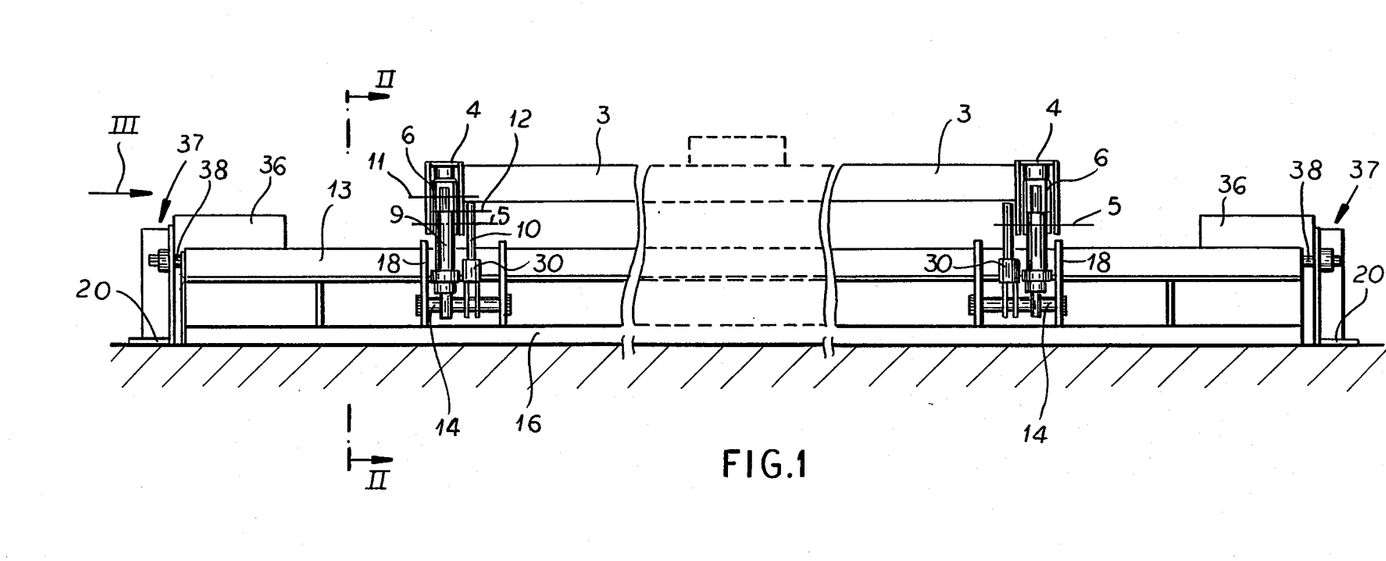
FIG. 1 is a rear elevational view of the soil-working implement according to the invention.

The transmission housing 37 (FIG. 1) are provided with skids 20 which rest upon the ground and laterally guide the soil-loosening unit 19.

The transmission housings 37 are coupled by journal pins 38 with the box girder 13. The two hydraulic motors 36 are supplied with hydraulic fluid in parallel in accordance with conventional hydraulic drive principles.

For adjustment of the four-point linkage, I provide a positioning cylinder 9 whose piston is connected to the journal 14 of the crank 18 and whose cylinder is connected by a pivot 11 to the lever 6.

The kinematics of the linkage thus is such that by extension of the cylinder 9 and retraction of the piston/cylinder unit 22 which forms part of the three-point hitch to the tractor, the soil-loosening unit 19 can be raised and drawn toward the tractor or tracked vehicle and withdrawn from the ground while the smoothing board 16 remains in its position substantially scraping the ground as a comparison of FIGS. 4 and 5 will show.

I claim:
1. A ground-working implement which comprises:
   a beam connectable to a vehicle and adapted to be raised and lowered relative to the ground, said beam extending longitudinally in a direction of travel of said implement;
   a holder extending generally transversely of said direction and mounted on said beam so as to swing about a longitudinal axis thereof in a pendulous movement;
   a ground-loosening unit mounted on said holder;
   a smoothing board disposed generally rearwardly of said ground-loosening unit and mounted on said holder for leveling the ground behind said ground-loosening board; and
   a four-point linkage coupling said ground-loosening unit and said smoothing board to one another and to said holder so that an orientation of the smoothing board with respect to the ground can be maintained upon lifting of said ground-loosening unit, said four-point linkage comprising two cranks and a coupling, a first of said cranks being rigidly connected to said ground-loosening unit and having a first main bearing mounted on said holder and about which said first crank is pivotal at a first axis, said coupling of said four-point linkage being fixed to said smoothing board, and a second of said cranks being pivotally connected to said holder at a second main bearing and being connnected to said smoothing board.

2. The implement defined in claim 1 wherein said second main bearing is adjustably mounted on said holder.

3. The implement defined in claim 2 wherein said second main bearing is formed on a lever swingably mounted about said first axis and retainable in position by a fixing device.

4. The implement defined in claim 3 wherein said four-point linkage is constructed and arranged so that the position of said coupling remains substantially unaltered within ±5° upon elevation of said ground-loosening unit between a working position in which said ground-loosening unit engages the ground and an elevated rest position in which said ground-loosening unit is out of engagement with the ground.

5. The implement defined in claim 4 wherein said cranks differ in length, said first crank is longer than said second crank and the difference in length of said cranks is at most 30% of the length of the longer crank.

6. The implement defined in claim 4 wherein the distinctions between said first axis and a second axis defined by said second bearing is greater than the length of said coupling measured by the distance between journals between said coupling and said smoothing board.

7. The implement defined in claim 4 wherein in said working position of said ground-loosening unit, said coupling includes an angle with a parallel to the ground between 45° and 90°.

8. The implement defined in claim 7 wherein said angle is 60°.

9. The implement defined in claim 4 wherein the length of said first crank is about 5 to 6 times the length of said coupling.

10. The implement defined in claim 4, further comprising means for varying the effective length of said second crank.

11. The implement defined in claim 10 wherein said means for varying the effective length of said second crank is a hydraulic cylinder.

12. The implement defined in claim 3 wherein said fixing device comprises a threaded spindle traversing said lever and a nut threaded onto said spindle and braced against said lever.

13. The implement defined in claim 12 wherein said spindle is mounted by a rubber cushion on said holder.

* * * * *